United States Patent [19]

Macleod, Jr.

[11] Patent Number: 4,694,950
[45] Date of Patent: Sep. 22, 1987

[54] TAPE CASSETTE ASSEMBLY TRAY

[75] Inventor: Robert B. Macleod, Jr., Kennebunkport, Me.

[73] Assignee: Shape Inc., Me.

[21] Appl. No.: 654,131

[22] Filed: Sep. 25, 1984

[51] Int. Cl.$^4$ .............................................. B65G 49/00
[52] U.S. Cl. .............................. 198/465.3; 198/803.2; 206/511; 206/557; 220/72
[58] Field of Search .................. 198/648, 472, 465.1, 198/465.2, 465.3, 803.01, 803.2; 206/509, 511, 557; 220/72

[56] References Cited

U.S. PATENT DOCUMENTS

| 3,403,814 | 10/1968 | Asenbauer | 206/509 |
|---|---|---|---|
| 3,462,219 | 8/1969 | Gunn | 355/53 |
| 3,700,137 | 10/1972 | Souza | 206/511 |
| 3,761,070 | 9/1973 | Ruf | 269/59 |
| 3,976,289 | 8/1976 | Baghuis | 269/56 |
| 4,159,762 | 7/1979 | Bulwith | 198/648 |
| 4,279,337 | 7/1981 | Kachnik | 198/472 |
| 4,330,935 | 5/1982 | Blair, Jr. et al. | 29/884 |
| 4,403,687 | 9/1983 | Stevens et al. | 198/472 |
| 4,499,997 | 2/1985 | Swingley, Jr. | 220/72 X |
| 4,527,222 | 7/1985 | Swingley, Jr. | 206/509 X |
| 4,593,816 | 6/1986 | Langenbeck | 220/72 X |

Primary Examiner—Robert J. Spar
Assistant Examiner—Jonathan D. Holmes
Attorney, Agent, or Firm—Staas & Halsey

[57] ABSTRACT

An assembly tray is injection molded with an open bottom to provide access to articles supported by the tray during manufacturing. Gear teeth are included on the bottom of the tray in the shape of a timing belt for indexing the tray during manufacturing. Stacking ledges are provided in the rim on top of the tray so that one tray can be stacked on top of another without sticking. A torsion box is provided on the sides of the tray to provide torsional stability. The assembly tray can be selected from a stack of other trays, used in automated manufacturing and stacked in another stack. The assembly tray is particularly suited for assemblying components of tape cassettes.

27 Claims, 11 Drawing Figures

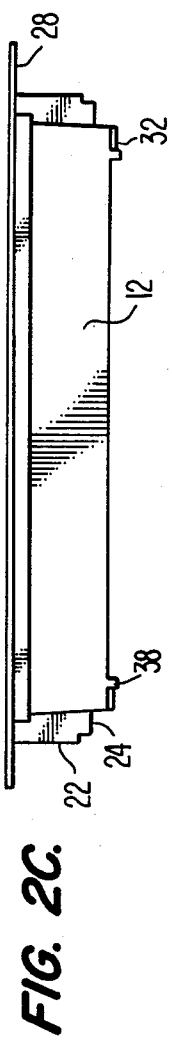
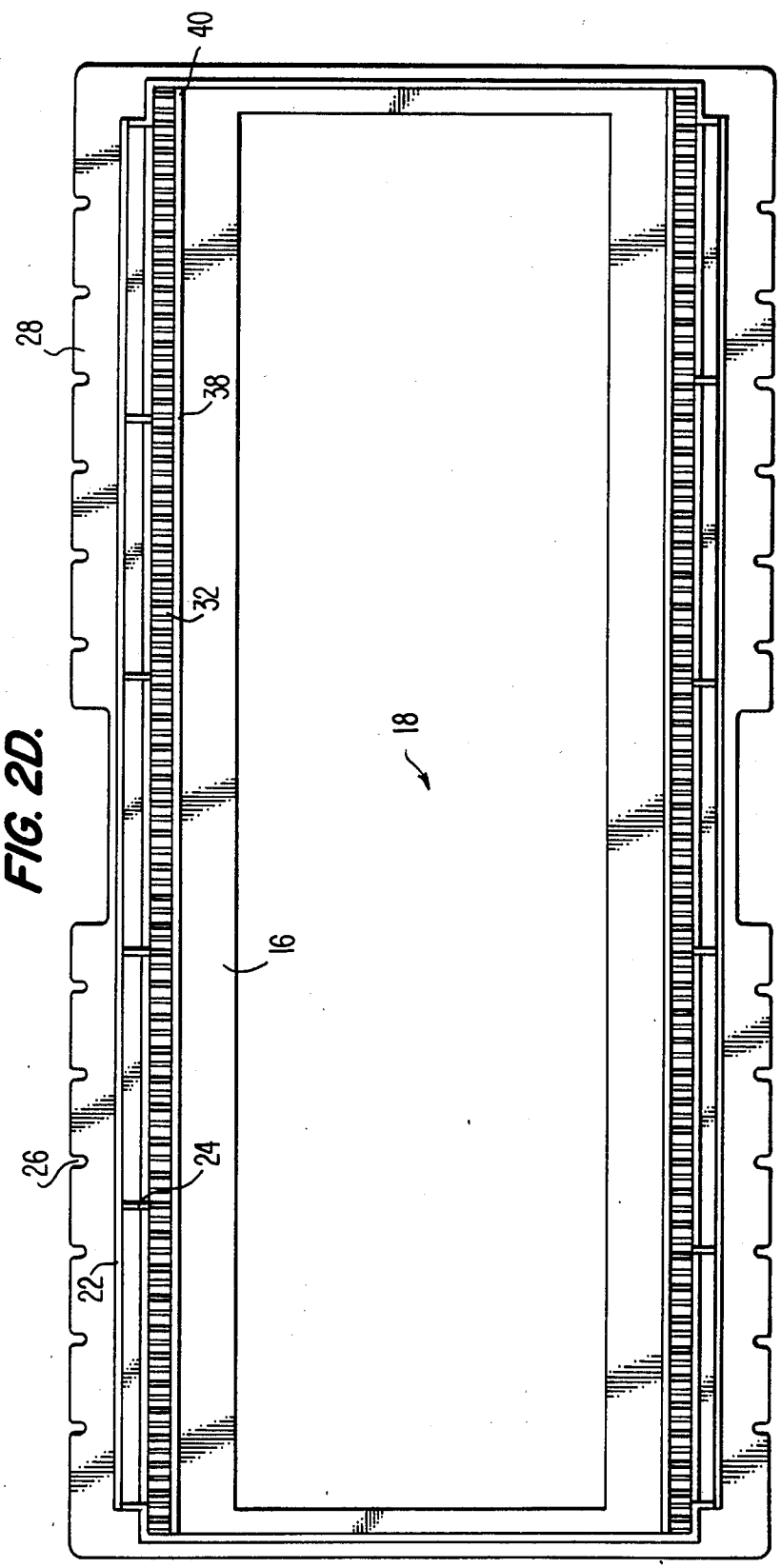
FIG. 2C.
FIG. 2D.

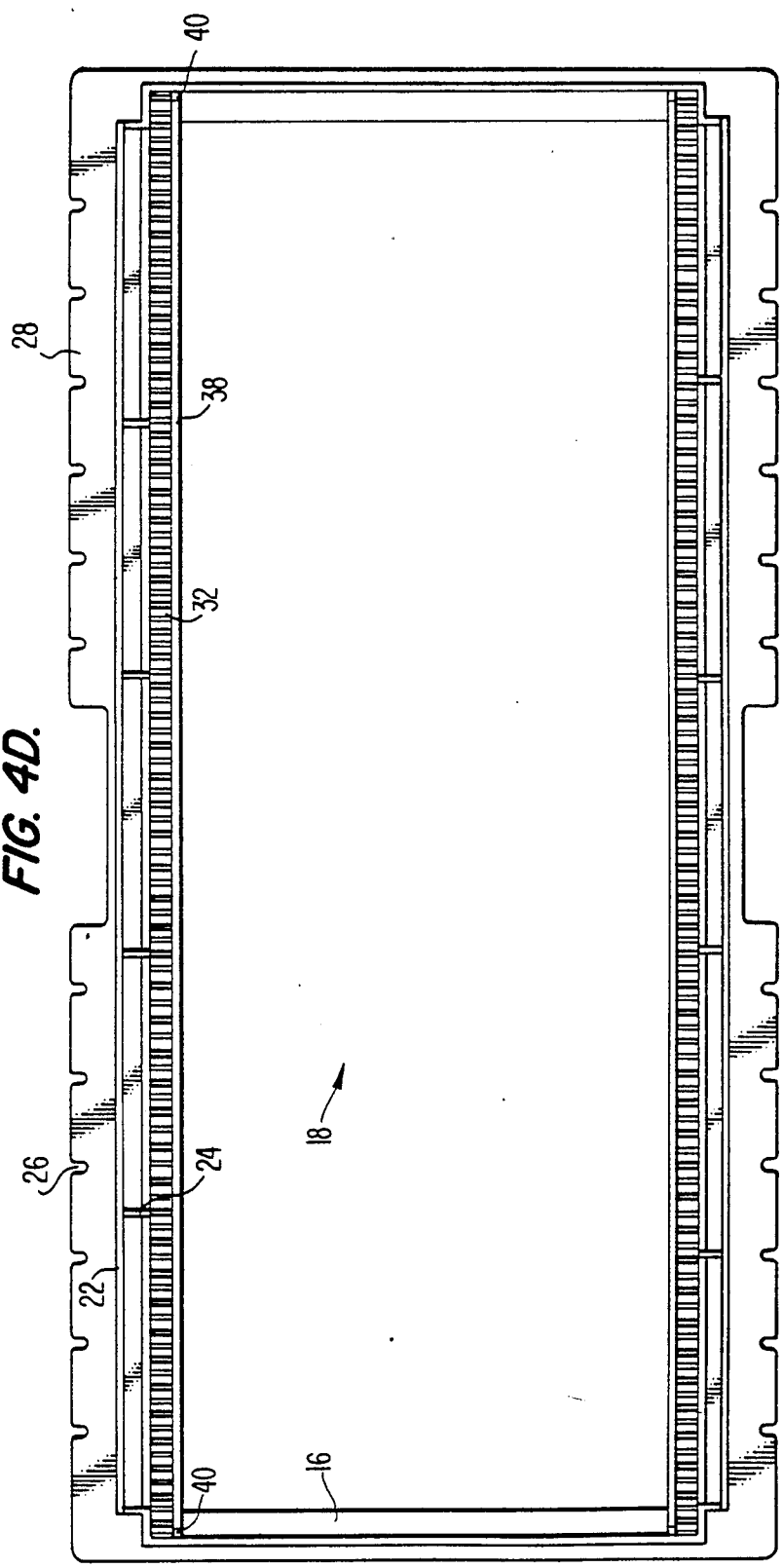
FIG. 4C.
FIG. 4D.

TAPE CASSETTE ASSEMBLY TRAY

BACKGROUND OF THE INVENTION

This invention relates to an assembly tray, and more particularly to an assembly tray for holding tape cassette components which are assembled in an automated assembly line.

It is known in the art to hold many small articles in a single apparatus during the assembly or manufacturing of the articles using automated equipment. For example, U.S. Pat. No. 3,976,289 discloses a base frame supporting a "removable table top" which has a 6×10 grid for holding parts. In the U.S. Pat. No. 3,976,289 patent, the table top remains stationary during manufacturing operations on the articles while machinery underneath the table top moves the articles around the grid. After the manufacturing process has been completed on all of the articles on the table top, the entire table top can be removed and a new table top with unprocessed articles can be mounted on the base frame in its place. The apparatus disclosed in the U.S. Pat. No. 3,976,289 patent requires complex manuevering equipment in the base frame to make full use of the removable table top.

Another apparatus which is used for assembling articles is disclosed in U.S. Pat. No. 4,330,935. Specialized equipment is not required to move the articles assembled on the apparatus disclosed in the U.S. Pat. No. 4,330,935 patent; however, the applicability of this apparatus is limited to articles which are assembled in a certain manner. The apparatus disclosed in the U.S. Pat. No. 4,330,935 patent is a stationary V-shaped trough containing channels which align sub-assemblies or contact elements with a housing portion. After a contact element is added to a housing portion, the housing portion is slid along the V-shaped trough to the next position where another contact element is guided along the channels into the housing portion. This process is repeated until the housing portion reaches the end of the V-shaped trough at which point the assembly operation is completed. While it may be possible to perform other types of operations by removing partially assembled housing portions from the V-shaped trough, the apparatus does not facilitate these operations. In addition, the apparatus disclosed in the U.S. Pat. No. 4,330,935 patent is designed for empty housing portions to be inserted at one end and completely assembled units to be removed at the other end, rather than an apparatus which can be used to carry articles from one location to another like the removable table top in the U.S. Pat. No. 3,976,289 patent.

Other prior art devices move a table top underneath one or more articles which remain stationary relative to the top of the table. Examples of such devices can be found in U.S. Pat. Nos. 3,462,219 and 3,761,070. In the U.S. Pat. No. 3,761,070 patent, a gear rack is attached to the side of a table for indexing the table. In the U.S. Pat. No. 3,462,219 patent, tiny triangular truncated pyramids are provided on the bottom surface of a table top and the upper surface of the structure supporting the table top. The triangular pyramids permit 2-dimensional indexing. Neither the U.S. Pat. No. 3,761,070 or U.S. Pat. No. 3,462,219 patent discloses a removable table top nor any detail of the table top structure.

As indicated by the above examples, prior art work supports for assembling small articles tend to be limited in their applicability to particular situations or limited in their usefulness in automated manufacturing. Further examples of the latter are pallets and trays without any features which facilitate automated manufacturing.

SUMMARY OF THE INVENTION

Accordingly, it is an object of the present invention to provide an assembly tray which is useful in automated manufacturing for many types of devices without requiring special support machinery.

It is another object of the present invention to provide an injection-molded plastic assembly tray with an open bottom to simplify access to articles, supported by the tray, during manufacturing of the articles.

It is yet another object of the present invention to provide an open-bottomed injection-molded plastic assembly tray having torsional rigidity.

It is a further object of the present invention to provide assembly trays which stack vertically without sticking when empty.

It is a yet further object of the present invention to provide an assembly tray which can be indexed to access one or more articles supported by the tray during manufacturing of the articles.

Finally, it is an object of the present invention to provide an assembly tray particularly suited for mass-production of components for tape cassettes, including attaching dust doors to cassette shells, printing of labels, etc.

To achieve the foregoing and other objects of the invention and in accordance with the purpose of the invention, there is provided an injection-molded plastic assembly tray, supporting articles during manufacturing of the articles, having ends and sides connected together, each of the ends and sides having a top edge and a bottom edge, and a bottom connected to the bottom edge of each of the sides and ends, the bottom having an opening through which the articles can be accessed during manufacturing. The sides of the assembly tray include torsion boxes which provide torsional rigidity and the bottom includes timing notches with which the assembly tray can be indexed. The top edges of the sides and ends are attached to a rim which includes stacking ledges which permit stacking of the assembly tray with other similar assembly trays without the trays sticking.

The assembly tray described above is well suited to the manufacture of tape cassettes on an automated assembly line which includes selecting a selected assembly tray from a first stack of empty assembly trays, inserting a cassette component into the selected assembly tray or performing an automated manufacturing step on the cassette component and indexing the selected assembly tray repeatedly following the insertion of the cassette component.

Additional objects and advantages of the invention will be set forth in part in the description which follows, and, in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 2(A)–2(D) are side, top, end and bottom views, respectively, of the first embodiment of the assembly tray;

FIGS. 4(A)–4(D) are side, top, end and bottom views, respectively, of the second embodiment of the assembly tray.

DESCRIPTION OF THE PREFERRED EMBODIMENTS

Figure 1:
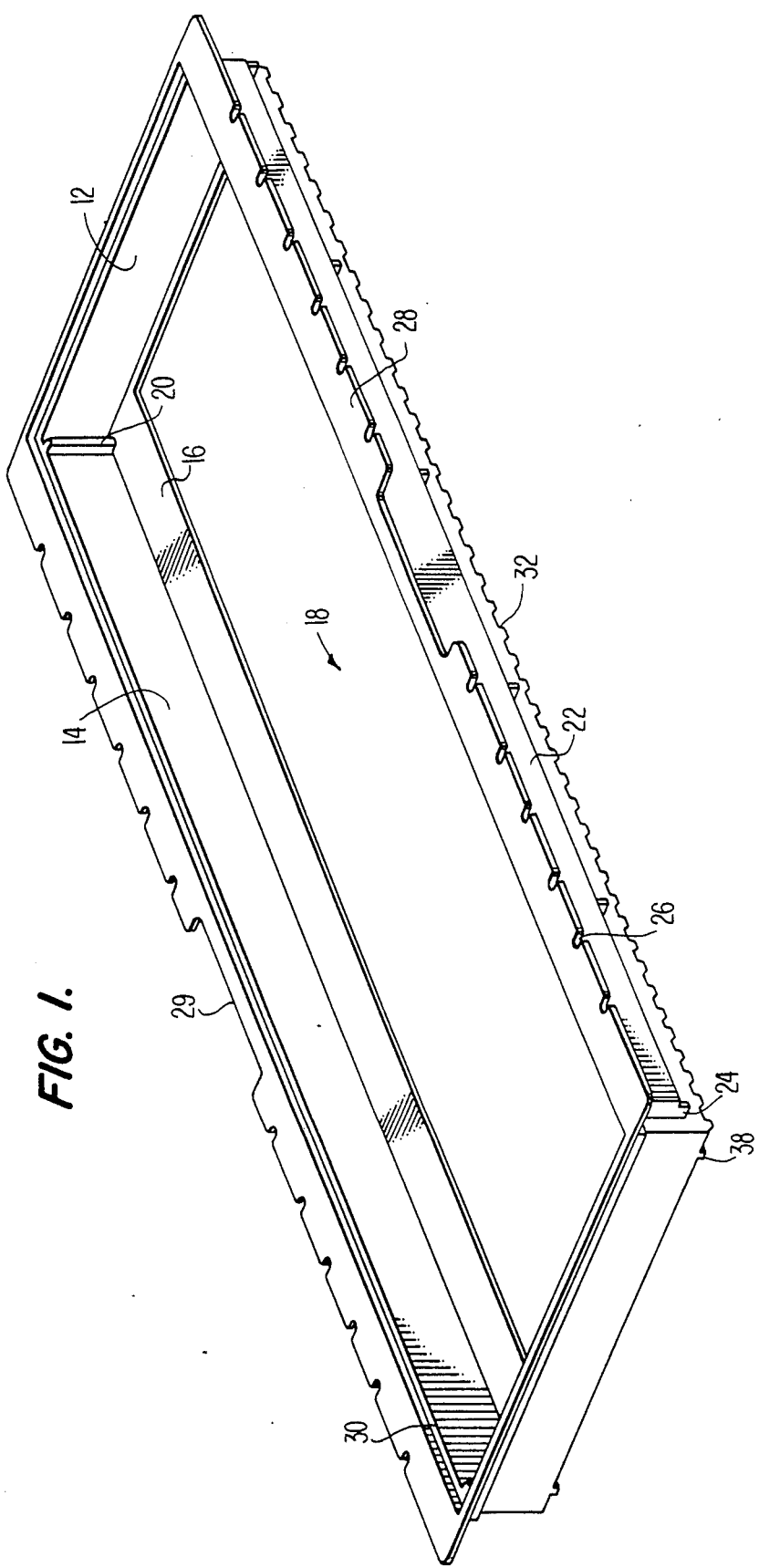
FIG. 1 is a perspective view of a first embodiment of an assembly tray in accordance with the invention.

A first embodiment of an assembly tray according to the present invention is illustrated in FIG. 1. The assembly tray in FIG. 1, includes ends 12 connected to sides 14. The ends 12 and sides 14 each have top and bottom edges. The bottom edges of the ends 12 and sides 14 are connected to a bottom 16 having an opening 18. Preferably, spacing ribs 20 are located on the interior of the sides 14 at least near the ends 12 of the tray. On each of the sides 14 is preferably a torsion box 22 which preferably includes stacking spacers 24 to help prevent sticking when the assembly tray is stacked. Alignment notches 26 are preferably located along the sides 14 on a lip or rim 28 which is attached to the top edges of the sides 14 and the ends 12 of the tray. The rim 28 includes a handhold 29 for picking up the asembly tray using human hands or a robot arm and stacking ledges 30 into which the bottom 16 fits when empty trays are stacked.

Side, top, end and bottom views of the assembly tray are provided in FIGS. 2(A)–2(D), respectively, and more clearly show significant features of the invention. Gear teeth 32 are preferably provided near both sides 14 on the exterior of the bottom 16 to perform a function analogous to a timing belt. The gear teeth 32 enable the assembly tray to be indexed under a robot arm 34 (FIG. 5) for insertion or processing of cassette components 36 supported by the assembly tray. The stacking spacers 24 extend beyond the torsion box 22 to a point at which they make contact with the top of an underlying assembly tray when the trays are stacked. The stacking spacers 24 are an integral part of the torsion box 22 which provides torsional rigidity. The side view in FIG. 2(A) and the bottom view in FIG. 2(D) best illustrate longitudinal runners 38 located on the exterior of the bottom 16 near the sides 14 and the gear teeth 32. Stacking notches 40 are provided in the longitudinal runners 38 so that when assembly trays are stacked, the stacking ledges 30 in the rim 28 can have the same height at the ends 12 as at the sides 14 and still support an assembly tray above it at the longitudinal runner 38, the gear teeth 32 and the stacking spacers 24.

Figure 2A:
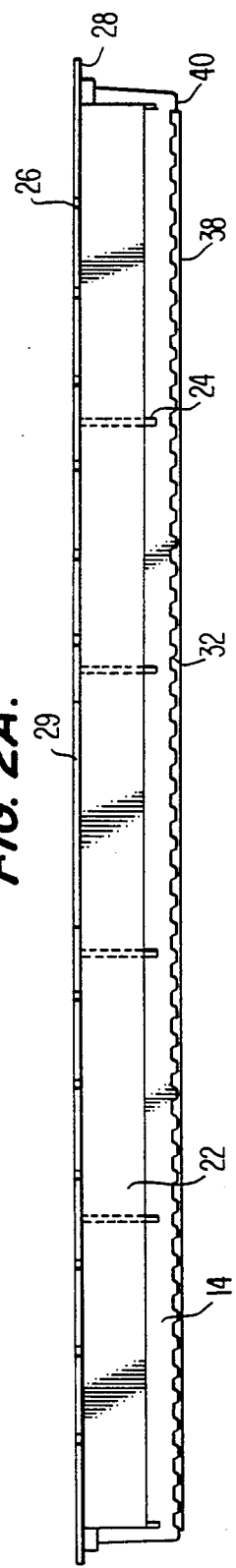
Figure 2B:
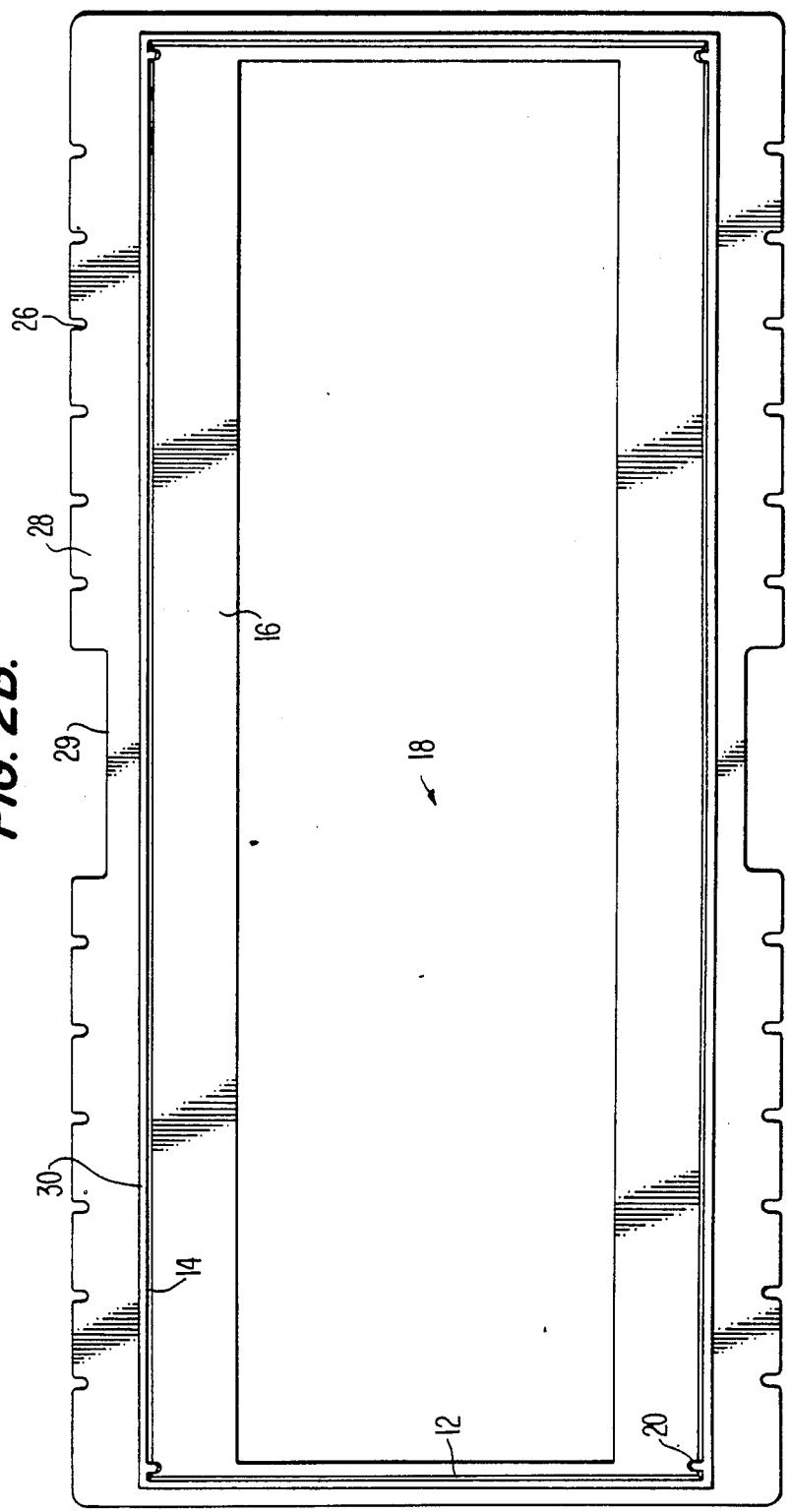
Figure 3:
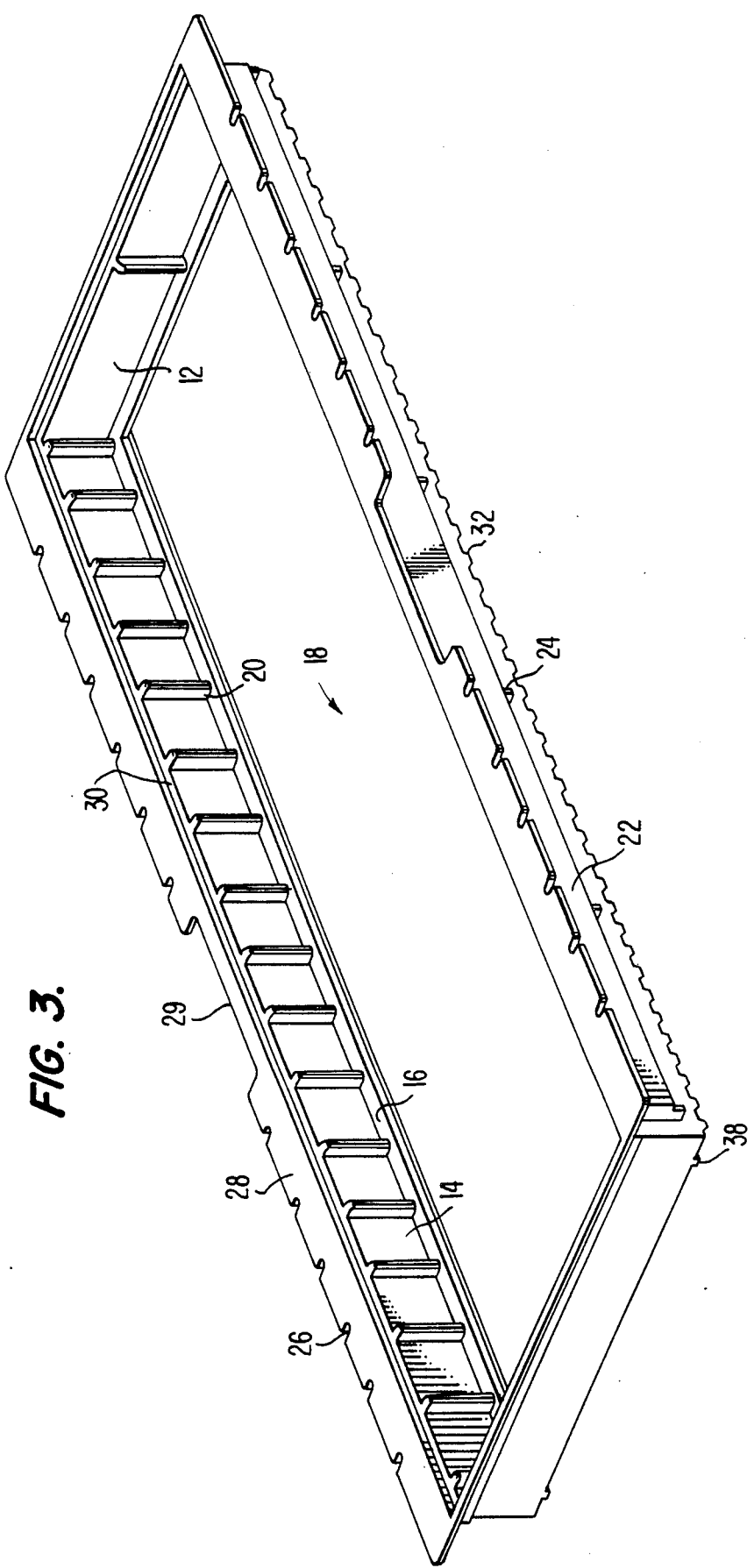
FIG. 3 is a perspective view of a second embodiment of an assembly tray in accordance with the invention.
Figure 4A:
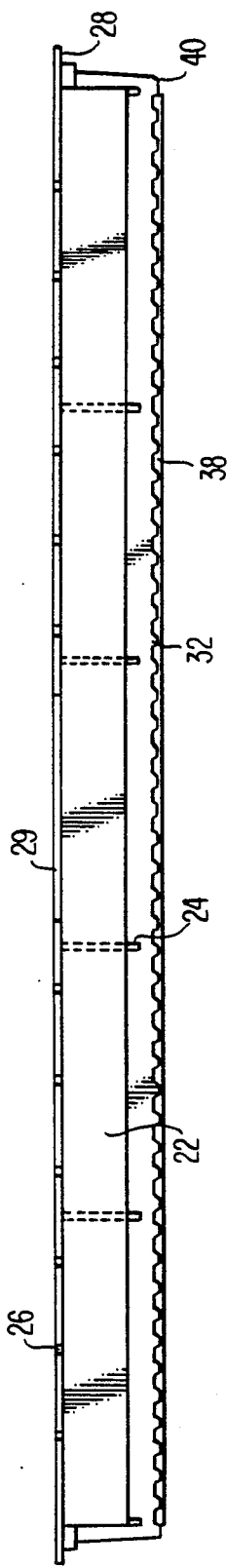
Figure 4B:
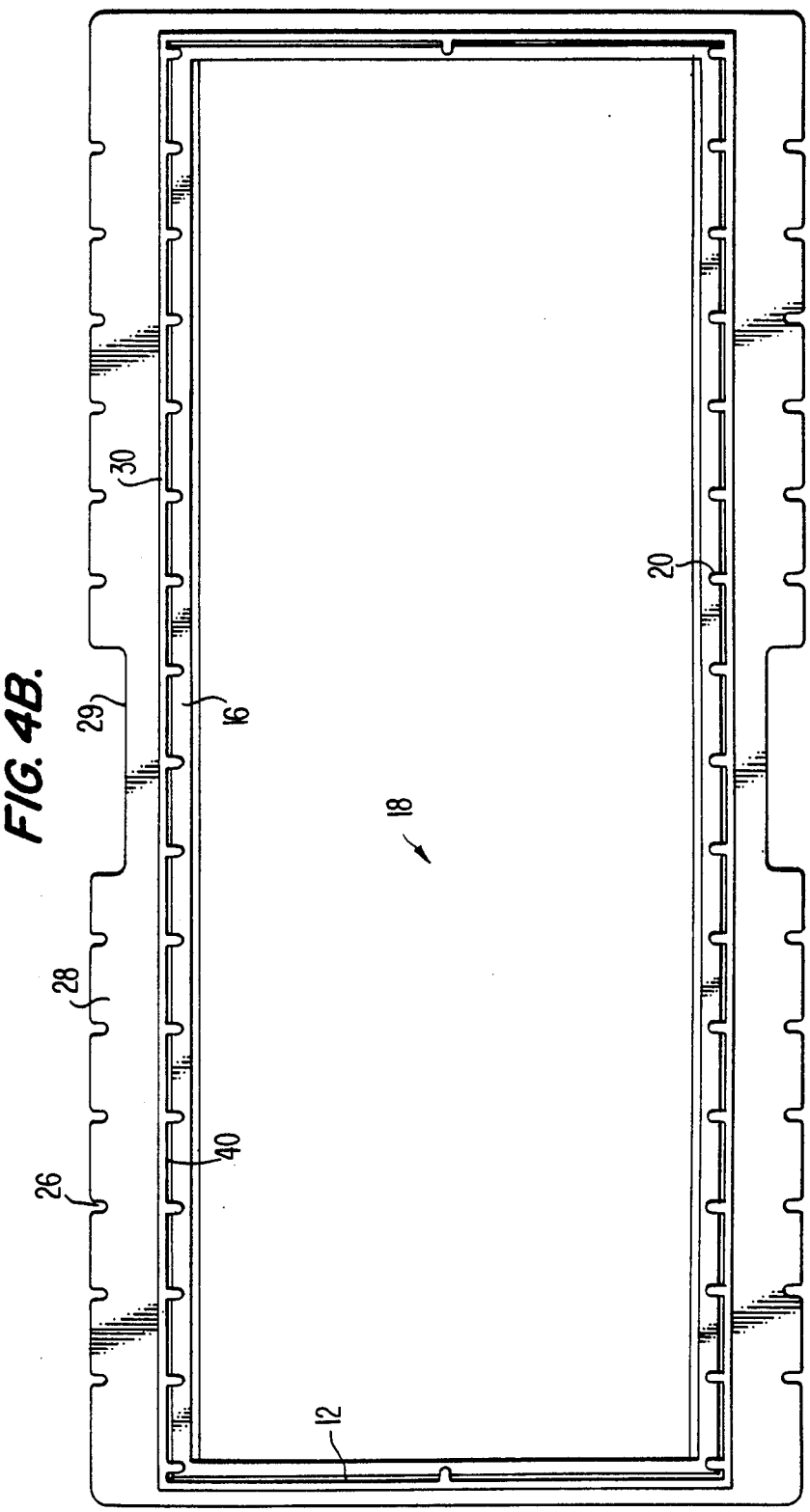

The assembly tray illustrated in FIGS. 1 and 2(A)–2(D), provides a combination of unique features which is not found in the prior art. The opening 18 in the bottom 16, as illustrated in FIG. 2D, is a continuously open area comprising a majority of the total area of the bottom 16 and permits access to the articles (cassette shells) 36 (FIG. 5) the tray supports to simplify removal of the articles 36 and for operations on the bottom of the articles 36 without removal from the tray. The torsion box 22 which provides increased torsional rigidity for the assembly tray is very important when the opening 18 in the bottom 16 is large and the tray is shallow, as illustrated in the drawings, with a length to depth ratio of, e.g., 10:1; without the torsion boxes 22, the trays would easily twist. The stacking ledges 30, stacking spacers 24 and stacking notches 40 interact to permit the stacking of empty assembly trays without permitting surface contact over a large area which could result in sticking. This feature is particularly important when the assembly trays are used on an automated assembly line, which would be subject to constant interruption if the trays had a tendency to stick.

The gear teeth 32 and alignment notches 26 are provided for use of the assembly tray in automated manufacturing. The gear teeth 32 permit precise indexing of the trays for access to individual cassette components 36 or groups of components by a robot arm 34 or the like. The alignment notches 26 can be used to align the robot arm 34 or other equipment which, for example, moves alongside the assembly tray. Indexing in and of itself is not novel as indicated by the U.S. Pat. No. 3,761,070 and U.S. Pat. No. 3,462,219 patents; however, no known prior art device includes gear teeth on the bottom of a removable assembly tray, nor this feature in combination with the other features of an open bottom 16, stacking ledges 30 or torsion box 22.

Figure 5:
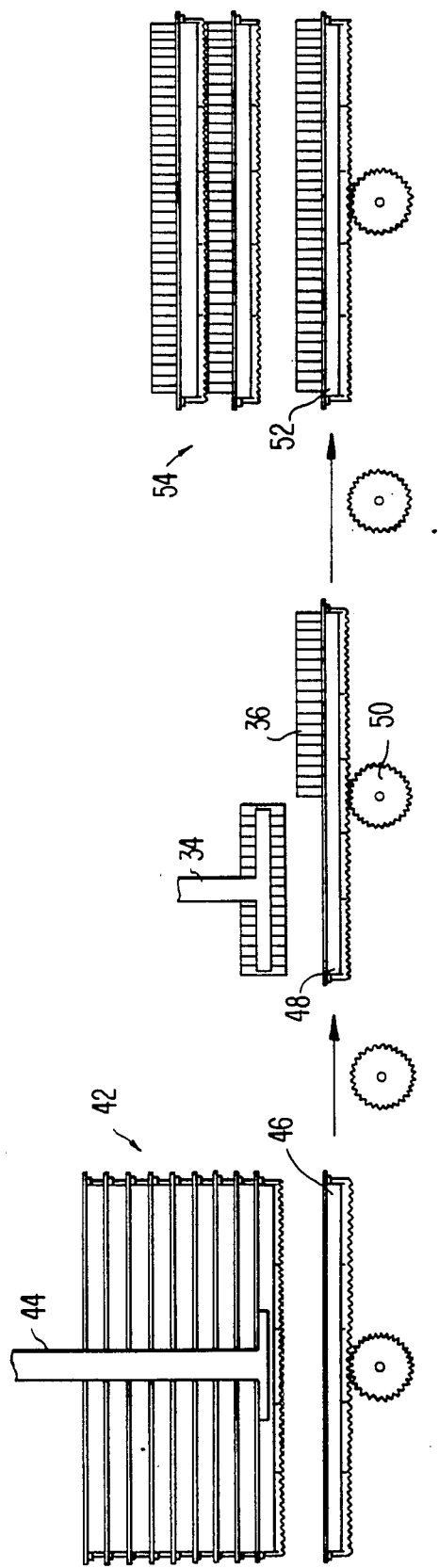
FIG. 5 is an illustration of automated manufacturing of tape cassettes using an assembly tray according to the present invention.

The assembly tray illustrated in FIGS. 1 and 2, is suited for holding cassette components such as cassette shells 36 which are inserted with one abutting the next as illustrated in FIG. 5. The opening 18 in the bottom 16 permits an automated manufacturing step such as labelling or printing to be performed on one end of the cassette shells 36 while the other end may have a dust door subassembly attached without any need for removing the cassette shells 36. If it is necessary for the cassette shells 36 to be removed, at least partially, from the assembly, the open bottom 16 permits a device (not shown) underneath the assembly tray to push one or more of the cassette shells 36 upwards so that the robot arm 34 can more easily grasp them.

Perspective, side, top, end and bottom views of the second embodiment for an assembly tray are illustrated respectively in FIGS. 3 and 4(A)–4(D) which use the same reference numerals for similar parts as FIGS. 1–2(D). The exterior and the rim 28 of the second embodiment of the assembly tray are the same as in the first embodiment. The second embodiment adds an additional fifteen (15) spacing ribs 20 on the interior of both sides 14 of the assembly tray for a total of seventeen (17) spacing ribs 20. A single spacing rib 20 is provided at each end 12 of the second embodiment of the assembly tray. The spacing ribs 20, each with a radius, in both embodiments are included to insure that the cassette components loaded in the assembly trays are properly spaced and unmarked. In the tray illustrated in FIG. 3, the alignment notches 26 are each aligned with a spacing rib 20. However, this not a requirement of the invention; rather, the inclusion, number and spacing of both alignment notches 26 and spacing ribs 20 depends on the particular application.

The additional spacing ribs 20 in the second embodiment of the assembly tray are needed for smaller parts such as dust doors which are inserted into the cassette shells 36 for which the assembly tray in the first embodiment is provided. One way of performing the assembly of dust doors on cassette shells 36 is to run two automated assembly lines in synchronism and use a robot arm to grasp one dust door subassembly from an assembly tray in one line and attach it to a cassette shell in the other line. The dust door subassemblies may include a dust door to which a spring has been attached which keeps the dust door normally closed but permits access to a tape in the cassette shell.

The assembly trays of both the first and second embodiments are manufactured using injection molding. In producing assembly trays using injection molding, the following steps are followed. First, molds are created for an assembly tray to be used in a particular application. Next a suitable material, which may include regrind of broken or defective trays or other plastic articles, is injected as a liquid into the mold. Finally, the molded trays are removed from the molds after they have hardened. Use of injection molding provides significant advantages to a tape cassette manufacturer since injection molding is typically used to form some of the cassette components themselves. Therefore, the same material and equipment can be used for assembly trays resulting in cost savings by constructing the assembly trays in-house without requiring the additional equipment and skills required for a different process. In addition, a one-piece injection-molded assembly tray is considerably more sturdy than a vacuum-formed assembly tray, for example.

An example of a step in automated manufacturing using either the first or second embodiment of the assembly trays is illustrated in FIG. 5. An empty tray stack 42 is supported by a tray support 44 above a ready tray 46 which will be the next tray used. A partially filled tray 48 is depicted receiving cassette shells 36 from a robot arm 34. An indexing wheel 50 moves the partially filled tray 48 forward after the insertion of each cassette shell 36 or group of cassette shells 36. A filled tray 52 is moved to the right where it is placed in a stack 54 of filled trays.

An assembly tray according to the present invention is easily adapted to many types of processing steps and equipment. For example, printing or labelling equipment can be located above or below the tray since the tray has an opening 18 in the bottom 16. The open bottom also facilitates removal of individual cassette shells 34 for processing such as machining, drilling, assembly, etc. The alignment notches 26 allow the assembly tray to remain stationary while manufacturing equipment moves past the tray and accesses each article 34 in turn.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention and the appended claims and their equivalents.

What is claimed is:

1. An injection-molded plastic assembly tray for supporting a plurality of articles during manufacturing of the articles, the assembly tray comprising:
    a single frame of shallow height and elongated length compared to width, for directly supporting therein the plurality of articles arranged along the elongated length, the frame including
    ends, each of said ends having a top edge and a bottom edge, the width being measured parallel to the bottom edge of said ends;
    sides, connected to said ends, each of said sides having a top edge and bottom edge, the elongated length being measured parallel to the bottom edge of said sides; and
    torsion boxes, extending along substantially all of the elongated length of each of said sides at the top edge thereof, for providing rigidity of said single frame, each torsion box having a solid top, solid sides, solid ends, an open bottom and stacking spacers abutting and supporting the sides and top of each torsion box, the stacking spacers extending through the open bottom of the torsion box so that when a first assembly tray is stacked above an empty second assembly tray, the stacking spacers of the first assembly tray contact the top of the torsion box of the second assembly tray; and
    a bottom, connected to the bottom edge of each of said sides and said ends, having a continuously open area along the elongated length through which each of the plurality of articles can be directly accessed during manufacturing.

2. The assembly tray as recited in claim 1, wherein said bottom comprises gear teeth, located along at least one of said sides, for indexing the assembly tray during manufacturing of the articles.

3. The assembly tray as recited in claim 2, wherein the tray is formed of a single piece of injection-molded material.

4. The assembly tray as recited in claim 2, further comprising a rim having stacking ledges, each of said stacking ledges connected to the top of one of said torsion boxes and the top edge of one of said sides and ends, said bottom of the first assembly tray contacting said stacking ledges of the second assembly tray when the first assembly tray is stacked on the second assembly tray.

5. The assembly tray as recited in claim 4, wherein the assembly tray is formed of a single piece of injection-molded material.

6. The assembly tray as recited in claim 4, wherein said bottom further comprises longitudinal runners located along said sides and projecting beyond said gear teeth in a perpendicular direction to said bottom.

7. The assembly tray as recited in claim 6, wherein each of said longitudinal runners includes stacking notches, said stacking notches being located adjacent the bottom edge of said ends and projecting in the perpendicular direction as far as said gear teeth, said stacking notches and said gear teeth of the first assembly tray contacting said stacking ledges of the second assembly tray when the first and second assembly trays are stacked.

8. The assembly tray as recited in claim 7,
    wherein said assembly tray has an interior, said sides and said ends facing upon the interior, and
    wherein said sides comprise spacing ribs for positioning the article in the interior of said assembly tray, and wherein said ribs have a radius.

9. The assembly tray as recited in claim 8, wherein the shallow height is measured from the top edge to the bottom edge of said sides and the width is at least ten times greater than the shallow height.

10. The assembly tray as recited in claim 9, wherein said bottom has a total area and the continuously open area is a majority of the total area of said bottom.

11. The assembly tray as recited in claim 1, wherein the assembly tray is formed of a single piece of injection molded material.

12. The assembly tray as recited in claim 11, further comprising a rim having stacking ledges connected to the top of said torsion boxes and the top edge of said ends and said sides, said bottom of the first assembly tray contacting said stacking ledges of the second assembly tray when the first assembly tray is stacked on the assembly tray.

13. The assembly tray as recited in claim 12, wherein the assembly tray is formed of a single piece of injection-molded material.

14. The assembly tray as recited in claim 12, wherein the shallow height is measured from the top edge to the bottom edge of said sides and the width is at least ten times greater than the shallow height.

15. The assembly tray as recited in claim 14, wherein said bottom has a total area and the continuously open area is a majority of the total area of said bottom.

16. The assembly tray as recited in claim 11, wherein said rim includes alignment notches.

17. The assembly tray as recited in claim 11, wherein the assembly tray has an interior, said sides and said ends facing upon the interior, and further comprising spacing ribs on said sides for positioning the articles in the interior of said assembly tray, and wherein said ribs have a radius.

18. The assembly tray as recited in claim 1, further comprising a rim having stacking ledges connected to the top of said torsion boxes and the top edge of said ends and said sides, whereby when the first assembly tray is stacked above the second assembly tray, said bottom of the first assembly tray contacts said stacking ledges of the second assembly tray.

19. The assembly tray as recited in claim 18, wherein said rim includes alignment notches.

20. The assembly tray as recited in claim 19, wherein said rim further includes handholds.

21. The assembly tray as recited in claim 20, wherein the assembly tray is formed of a single piece of injection-molded material.

22. The assembly tray as recited in claim 18, wherein the assembly tray has an interior, said sides and said ends facing upon the interior, and further comprising spacing ribs on said sides for positioning the articles in the interior of said assembly tray, and wherein said ribs have a radius.

23. The assembly tray as recited in claim 22, wherein the shallow height is measured from the top edge to the bottom edge of said sides and the width is at least ten times greater than the shallow height.

24. The assembly tray as recited in claim 23, wherein said bottom has a total area and the continuously open area is a majority of the total area of said bottom.

25. The assembly tray as recited in claim 1, wherein the shallow height is measured from the top edge to the bottom edge of said sides and the width is at least ten times greater than the shallow height.

26. The assembly tray as recited in claim 25, wherein said bottom has a total area and the continuously open area is a majority of the total area of said bottom.

27. An injection-molded plastic assembly tray for supporting a plurality of cassette shells during a manufacturing process, each of the cassette shells having measurements, in decreasing magnitude, of length, width and depth, the assembly tray comprising:

a single frame, having a height less than one-half of the width of the cassette shells and an elongated length compared to width, for directly supporting therein the plurality of cassette shells, the frame including ends, each of said ends having a top edge and a bottom edge, the width being measured parallel to the bottom edge of said ends;

sides, connected to said ends, each of said sides having a top edge and a bottom edge with the height being measured therebetween, the elongated length being measured parallel to the bottom edge of said sides; and torsion boxes, extending along substantially all of the elongated length of each of said sides at the top edge thereof, for providing rigidity to said single frame, each torsion box having a solid top, solid sides, solid ends, an open bottom and stacking spacers abutting and supporting the sides and top of each torsion box, the stacking spacers extending through the open bottom of the torsion box so that when a first assembly tray is stacked above an empty second assembly tray, the stacking spacers of the first assembly tray contact the top of the torsion box of the second assembly tray; and a bottom, connected to the bottom edge of each of said sides and said ends, having a continuously open area through which each of the plurality of cassette shells can be directly accessed during the manufacturing process, the length of the cassette shells extending from one of said sides to the other of said sides and the width of said shells extending substantially perpendicular to said bottom and at least twice the height of said sides.

* * * * *